(12) United States Patent
Hansen et al.

(10) Patent No.: US 9,027,045 B2
(45) Date of Patent: May 5, 2015

(54) CONSUMPTION LIKELIHOOD OF LINEAR CONTENT STREAMS

(75) Inventors: Eric Andrew Hansen, Draper, UT (US); David H. Woolsey, Lehi, UT (US); Nathan A. Purser, Highland, UT (US)

(73) Assignee: Adobe Systems Incorporated, San Jose, CA (US)

( * ) Notice: Subject to any disclaimer, the term of this patent is extended or adjusted under 35 U.S.C. 154(b) by 189 days.

(21) Appl. No.: 13/335,736

(22) Filed: Dec. 22, 2011

(65) Prior Publication Data

US 2014/0304726 A1    Oct. 9, 2014

(51) Int. Cl.
  *H04H 60/43* (2008.01)
  *H04N 21/25* (2011.01)
  *H04N 21/258* (2011.01)
  *H04N 21/442* (2011.01)
  *H04N 21/658* (2011.01)

(52) U.S. Cl.
  CPC ....... *H04N 21/25891* (2013.01); *H04N 21/251* (2013.01); *H04N 21/44222* (2013.01); *H04N 21/6582* (2013.01)

(58) Field of Classification Search
  CPC ..................................................... H04H 60/43

USPC ........................................................... 725/14
See application file for complete search history.

(56) References Cited

U.S. PATENT DOCUMENTS

| | | | |
|---|---|---|---|
| 7,818,419 B1 | 10/2010 | McAllister et al. | |
| 8,087,041 B2 | 12/2011 | Fu et al. | |
| 8,209,723 B2 | 6/2012 | Sakaguchi et al. | |
| 2003/0101449 A1* | 5/2003 | Bentolila et al. | 725/10 |
| 2008/0263591 A1 | 10/2008 | de Heer | |
| 2009/0055268 A1 | 2/2009 | Knoller et al. | |
| 2009/0055860 A1 | 2/2009 | Knoller et al. | |
| 2009/0055862 A1 | 2/2009 | Knoller et al. | |
| 2009/0133071 A1 | 5/2009 | Sakai et al. | |
| 2009/0133081 A1 | 5/2009 | Sakai et al. | |
| 2012/0026397 A1 | 2/2012 | Gummagatta | |
| 2012/0144419 A1 | 6/2012 | Gu et al. | |

* cited by examiner

*Primary Examiner* — Jefferey Harold
*Assistant Examiner* — Sihar Karwan
(74) *Attorney, Agent, or Firm* — Kilpatrick Townsend & Stockton LLP

(57) ABSTRACT

The likelihood of consumption of a linear content stream may be determined. Information that includes data indicative of user interaction with a client device may be received. The information may correspond to a period during which the client device received linear content. The likelihood of consumption may be determined for that period based on the received information.

14 Claims, 5 Drawing Sheets

CONSUMPTION LIKELIHOOD OF LINEAR CONTENT STREAMS

BACKGROUND

Analytics data may be collected and analyzed for website providers who wish to collect data that describes usage and visitation patterns for their websites and for individual webpages within the sites. This data is often referred to as web analytics data. Linear content (e.g., live television streams), however, presents a user interaction paradigm different than that of a standard web browser. For instance, while the time spent in a browser or mobile application can be tracked relatively easily due to clearly defined user actions, linear content does not have an explicit start or end—channels are never intended to go off-air. Moreover, in the example of television, users frequently turn off the television while leaving the set-top box/DVR on and tuned-in to a channel. Additionally, as compared to web browsing, a user consuming linear content typically has much fewer interactions with the system. As a result, generating and processing analytics data for linear content presents many challenges that do not exist in other systems.

SUMMARY

This disclosure describes techniques and structures for determining the likelihood of consumption of a linear content stream. In one embodiment, information that includes data indicative of user interaction with a client device may be received. The information may correspond to a period during which the client device received linear content. The likelihood of consumption may be determined for that period based on the received information.

In some embodiments, a client device may receive one or more interactions from a client control device during a period in which the client device receives linear content. The client device may provide information, including data corresponding to the one or more interactions, to a server configured to determine a likelihood of consumption of the linear content based on the information. In some embodiments, the client device may generate and/or provide the information in response to an occurrence of a predefined event.

Figure 1:
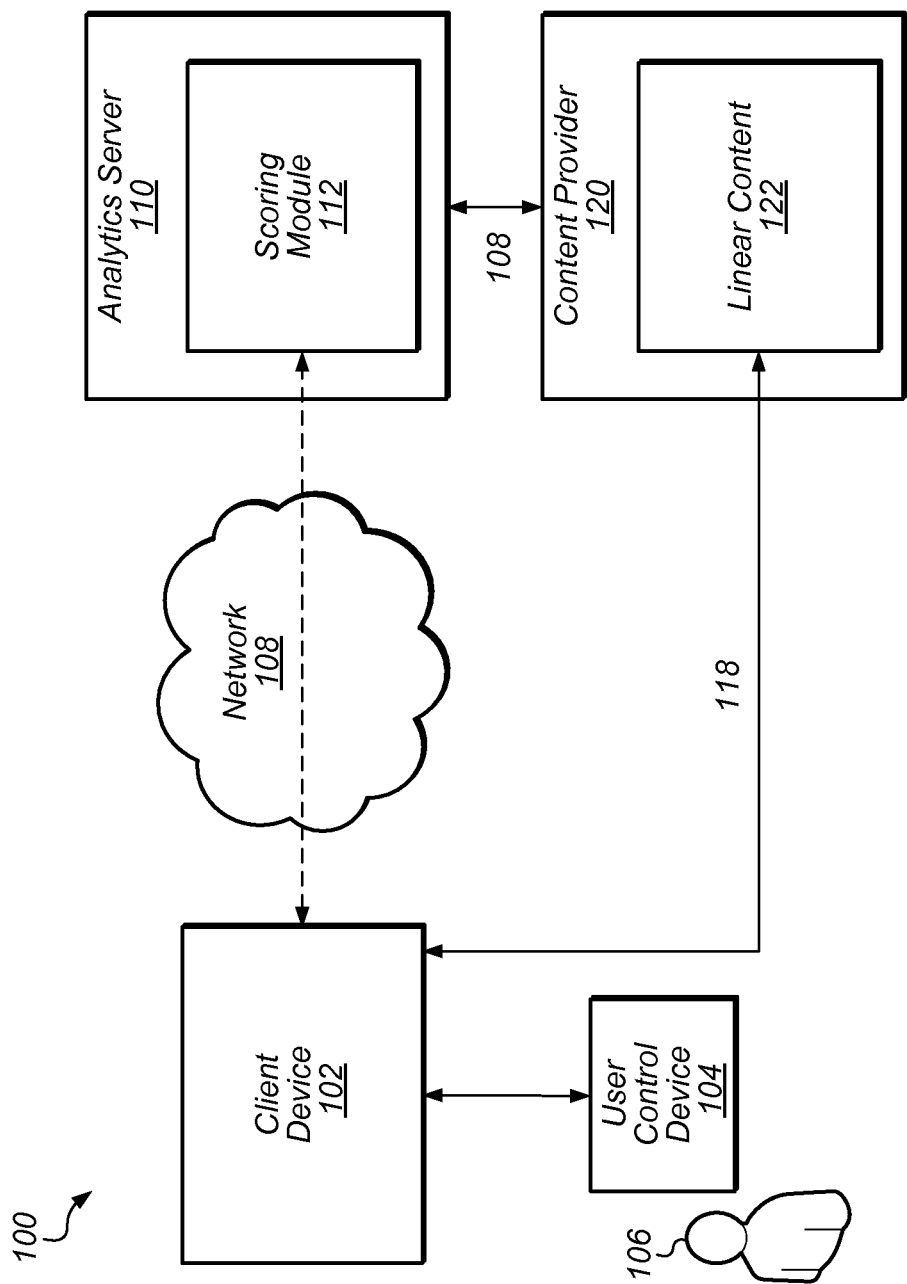
FIG. 1 is a block diagram that illustrates an example analytics system, according to some embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the embodiments to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, in a string of values used in determining a likelihood of consumption, the terms "first" and "second" values can be used to refer to any two of the values in the string. In other words, the "first" and "second" values are not limited to logical value 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Various embodiments of methods and apparatus for generating information related to linear content consumption and determining a likelihood of consumption of linear content are described. Some embodiments may include a means for generating information related to linear content consumption and/or a means for determining a likelihood of consumption of linear content. For example, an information generating module may generate information that includes data corresponding to one or more user interactions. Or, a scoring module may determine a likelihood of consumption of linear content based on the received information. The information generating module and scoring module may, in some embodiments, be implemented by program instructions stored in a computer-readable storage medium and executable by one or more processors (e.g., one or more CPUs or GPUs) of a computing apparatus. The computer-readable storage medium may store program instructions executable by the one or more processors to cause the computing apparatus to perform generating linear content consumption information and/or determining a likelihood of consumption of linear content, as described herein. Other embodiments may be at least partially implemented by hardware circuitry and/or firmware stored, for example, in a non-volatile memory.

Although certain embodiments are described with respect to linear video content (e.g., satellite television, cable television, OTA television, etc.), it will be appreciated that the techniques disclosed herein may be employed with other forms of linear content, such as linear audio content (e.g., satellite radio, over the air radio, etc.).

Turning now to the figures, FIG. 1 is a block diagram that illustrates an analytics system 100 (e.g., content analytics), according to some embodiments of the present disclosure. In the illustrated embodiment, system 100 includes content provider 120, client device 102, and analytics server 110. Each of content provider 120, client device 102, and analytics server 110 may be communicatively coupled to one another via a network 108. Network 108 may include any channel for providing effective communication between each of the entities of system 100. In some embodiments, network 108 includes an electronic communication network, such as the internet, a local area network (LAN), wireless LAN (WLAN), WiMAX network, cellular communications network, or the like. For example, network 108 may include an internet network used to facilitate communication between each of the entities (e.g., content provider 120, client device 102, and analytics server 110) of system 100.

In the embodiment shown, content provider 120 may be communicatively coupled to client device 102 over another type of network connection, in addition to, or instead of, network 108. For example, in a linear video content example, content provider 120 may be communicatively coupled to client device 102 over a coaxial network 118, satellite network 118, OTA network 118, or a combination thereof whereas network 108 may be an internet or LAN. Still in other embodiments, client device 102 may not directly be communicatively coupled to analytics server 110 via network 108. Instead, client device 102 may be coupled indirectly to analytics server 110 via content provider 120 over the same communication link 118 in which content provider 120 may provide linear content to client device 102. For instance, content provider 120 may provider linear content 122 to client device 102 over communication link 118, which may, in turn, provide information (e.g., analytics data) to content provider 120 over communication link 118. In such an example, content provider 120 may then provide the information, for instance, over network 108, to analytics server 110 for further processing.

Content provider 120 may include linear content 122 (e.g., linear video, linear audio, etc.) that is provided to client device 102. As one example, linear content 122 may include linear stream television that may not have an explicit start or end (e.g., channels that may not go off-air). In some embodiments, content provider 120 may include content server (not shown) that may be used to store linear content 122.

Client device 102 may be a set-top box (e.g., cable, satellite, digital video recorder (DVR), digital video or audio player, radio, stereo, computer, mobile device (e.g., cellular phone, tablet device, etc.), or similar device that may be used to access linear content provided by content provider 120. In some embodiments, client device 102 may be used to receive linear content provided by content provider 120 and may provide the linear content for display (e.g., to a television, monitor, or other display) and/or for audio presentation (e.g., to speakers).

Client device 102 may be configured to receive interactions with user control device 104. User control device 104 may include a remote control, smart phone or other device usable to control client device 102, buttons or other control inputs on the client device 102 (e.g., buttons on front of set-top box), sensors (e.g., cameras to detect user consumption), or any other device capable of capturing interactions from user 106. In some embodiments, user 106 may interact with client device 102 via user control device 104. For instance, a user of linear video content may tune-in to a different channel, mute the sound, rewind and replay content (e.g., a user-initiated replay on a DVR), turn off client device 102, among many other user interactions.

Analytics server 110 may include a system for the collection and processing of information, such as analytics data. Analytics provider 110 may reside on a different network location from content provider 120 and client device 102. Information may include data that describes user interaction(s) with client device 102. For example, such information may include a quantity of user interactions with client device 102 since a reference point in time and a time of a most recent user interaction with client device 102. Additionally, as described herein, information provided to analytics server 110 by client device 102 may include information regarding an on/off state of another device coupled to client device 102, such as a television/display and/or speakers. Other information may include tune-in or tune-out events, other user-generated events, a number of assets since the last tune-in, time passed since tune-in, and a time stamp. Additional information may also be provided, such as a client device identifier, firmware/software version number, etc. In some instances, the additional information may not be used by analytics server 110 performing the techniques described herein.

Analytics server 110 may receive information from one or more client devices. For example, analytics server 110 may include scoring module 112 to process information received from the one or more client devices, which could be many client devices. Analytics server 110 may include memory, dedicated or otherwise, to store the information received from client device(s) 102. The information from various client devices may be combined together before processing by scoring module 112 for a collective likelihood of consumption or information from each client device 102 may be processed separately by scoring module 112. In some embodiments, information may be stored in a remote location from analytics server 110. In some embodiments, scoring module 112 may retrieve the information from the remote location and/or database. Scoring module 112 may process the information to generate one or more analytics reports. An analytics report may include overviews, a consumption probability score, and statistical analyses describing the likelihood of consumption of linear content. The likelihood of consumption may be an indication that the linear content was consumed at some level of engagement.

Certain types of events may trigger or cause client device 102 to provide information to analytics server 110. Events that may cause reporting information may include a tune-in event, such as tuning in to a different channel, the end of an asset (e.g., single program of linear content), or the end of a time interval, among others. Similarly, certain types of events may cause scoring module 112 to determine the likelihood of consumption of the linear content. In some embodiments, as described herein, the types of events that trigger reporting or providing information to analytics server 110 may not be the same types of events that cause scoring module 112 to determining the likelihood of consumption.

Figure 2:
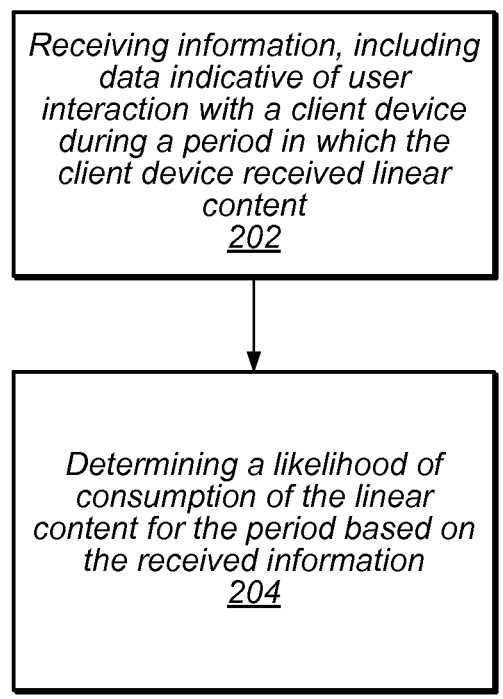
FIG. 2 is a flowchart that illustrates a method for processing linear content consumption information according to some embodiments.

Turning now to FIG. 2, one embodiment of processing linear content consumption information is illustrated. While the blocks are shown in a particular order for ease of understanding, other orders may be used. In some embodiments, the method of FIG. 2 may include additional (or fewer) blocks than shown. Blocks 202-204 may be performed automatically or may receive user input. In the embodiment shown in FIG. 2, blocks 202 and 204 may be performed by analytics server 110 of FIG. 1.

As illustrated at 202, information (e.g., a data packet, a string of values, etc.) may be received. In some instances, at least a portion of the information may be indicative of user interaction with a client device. Further, the information may correspond to a period during which the client device received linear content, for example, from content provider 120. Information may include an indication of a predefined event, including its type. For example, a predefined event may be a an expiration of a time interval, a tune-in or tune-out event, other events generated in response to user interactions, the end of an asset, on/off state of a consumption device (e.g., television, radio, etc.), etc. Other information received may include a quantity of user interactions with the client device since a reference point in time, a time of a most recent user interaction with the client device, number of assets since the last tune-in event, time elapsed since last tune-in, and/or timestamp of generation of the information, among other information. Additional information may also be received, such as linear content asset (e.g., television program, song, etc.) length, a client device identifier, firmware/software version number, channel name, time zone, asset ID, start time of asset, etc. Information may be received as metadata, for instance, in xml format in some embodiments.

In one embodiment, information may include a consumption device on/off state. In a linear video content example using a television, the consumption device on/off state may be determined, for example, via a signal from the television to the client device over a high-definition multimedia interface (HDMI) cable pin or other comparable interface (e.g., wireless HDMI, DVI, etc.). The pin may be dedicated for on/off notification or may be shared. In one embodiment, information may include a tune-in event. A tune-in event may be a user changing from one channel to another. Information may also include a tune-out event. A tune-out event may include a user turning off the client device, changing a channel, or going into a video on demand ("VOD") feature of a set-top box (and in turning, leaving the linear stream). Going into a VOD feature of a set-top box may, in other instances, not be a tune-out event, for example, where the linear content may still be viewable in a small box as part of the VOD guide. Information may further include other user-generated events. For example, a user may change the volume, invoke the channel guide, record a show, mute the volume, etc. In various embodiments, information may include the number of assets viewed and/or the time elapsed since the last tune-in event. Additionally, the information may include the time of day (e.g., 8 p.m., 4 a.m.). In embodiments that factor in time of day as part of the determination of block 204, the time of day from the information may be used, or alternatively, a different time of day may be generated by the server performing the determining. For instance, the time stamp using in the determining may represent the time of receipt of the information at block 204 instead of the time the information was generated. The time difference between receipt and generation may be small (e.g., within milliseconds, seconds, etc.) in some embodiments.

In one embodiment, the information may be presented as a string of values. The string may act like a web browser cookie and may persist on the client device from one event to another. The string of values may be pipe ('|') delimited. An example format that may include some of the information described herein may be: user initiated (Boolean)|timestamp of previous event|# of user interactions since last asset complete or tune-in|# of events since last tune-in|# of assets and length of assets.

The user initiated Boolean value may indicate true if the event triggering the generation of the information was either a tune-in or a tune-out. In other cases, the value may be false. A tune-in may be used herein to describe a tune-in to a channel for a minimum period of time. For example, that minimum period of time may be 20 seconds. After the 20 seconds has passed, information corresponding to the tune-in event may be generated. The minimum time period may filter transient tune-ins due to channel surfing. The string of values in a tune-in event may be true|<timestamp>|0|0|-. Information that corresponds to a time-out event may be generated for a time-out that occurs after a tune-in has already happened.

The timestamp of the previous event may be a timestamp in Unix epoch time (seconds since Jan. 1, 1970) in GMT/UTC since the last event. The timestamp of the previous event may be used such that the scoring module may score what has happened since the previous event.

The number of user interactions since the last asset complete or tune-in may be reset to zero at each asset begin or tune-in. An asset begin may be defined by an electronic program guide and may not be the actual beginning of the asset. As such, the previous asset end/current asset begin may occur between the assets (e.g., during a commercial break between assets). A user interaction may include any user interaction with the client device without tuning in to a new channel. A user interaction may not include multiple button presses of a remote for example, that may be required to perform some interaction. For example, if a user invokes a channel guide and presses the down arrow 25 times to search through the guide, such actions may represent a single user interaction and not 25 user interactions. Moreover, if a user completes the same user interaction multiple times within a certain period of time (e.g., 1 minute), the multiple occurrences may count as a single user interaction. For instance, invoking the guide twice within a minute may only be 1 user action. Example user interactions may include: guide accesses, volume up, volume down, mute, menu access, asset information, display information, etc.

Interstitial events, also referred to as interstitial hits, may be defined as events that are received periodically. The number of interstitial hits may be non-inclusive meaning that the first interstitial hit after tune-in may register as 0. As an example, if a user tuned-in at 11:05, an interstitial hit may be received at 11:15 with the 4th parameter of the string of values reading 0. At 11:30, assuming no further tune-in events, the 4th parameter may read 1 to reflect the second interstitial hit since tune-in.

The number and length of completed assets since last tune-in may be presented in the string of values as a comma separated list of the length of the assets that have completed. The character '-' may represent a reset value after a tune-in event. Note that this value may be the number of complete assets since tune-in. Thus, in some embodiments, if a tune-in occurs half-way through an asset, when the asset completes, it may not be reflected in the last parameter. Similar to the asset begin, an asset end may be defined by an electronic program guide and may not be the actual end of the asset. As an example string of values at the completion of a second 30 minute asset, the fifth parameter of the above example string of values may be 30, 30.

Figure 4:
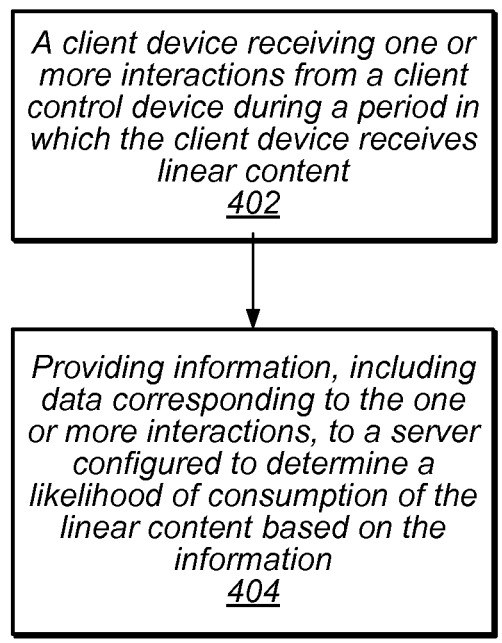
FIG. 4 is a flowchart that illustrates a method for generating linear content consumption information, according to some embodiments.

In various embodiments, as described in further detail at FIG. 4, information may be generated upon occurrence of tune-in events, tune-out events, start and/or end of an asset (e.g., television program, movie, song, etc.), and periodically (e.g., every 15 minutes, 30 minutes, etc.). Periodic generation of the information may be referred to as interstitial hits.

The information may be received directly from the client device, for example, over the internet. In other instances, the information may be received indirectly from the client device (e.g., via server proxy). One example of indirect receipt may be the client device providing the information to the content provider (e.g., over the same communication link used to provide content to the client device). The information may then be received from the content provider. The client device may be configured to provide the information to the analytics server in one or both manners. For example, a default path may be to provide the information directly to the analytics server. If the default path (e.g., internet, LAN) is not functioning properly, however, the path may failover to the indirect path through the content provider.

Figure 3:
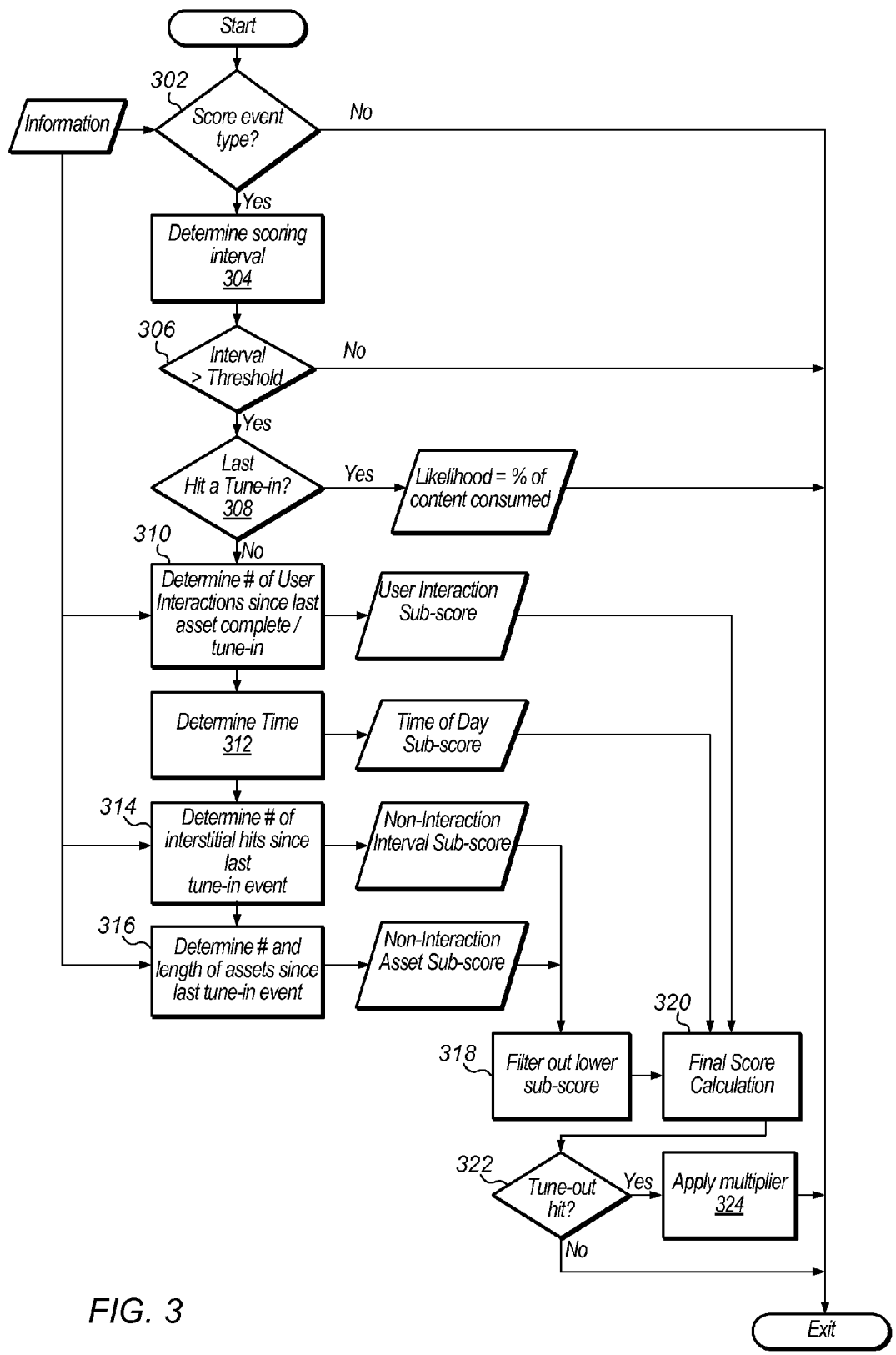
FIG. 3 is a flowchart that illustrates a method for scoring linear content consumption information according to some embodiments.

At 204, a likelihood of consumption of the linear content may be determined. The determination may be based on the information received at 202. The determination may, in various embodiments, include weighting various portions of the received information differently to determine a score. For example, portions of the information corresponding to explicit user interaction (e.g., number of interactions since the last tune-in event) may be weighted greater than other portions, such as time of day. One example of weighting the various portions of the received information is shown in FIG. 3, described below.

In some embodiments, blocks 202 and 204 may be performed after an occurrence of a predefined event. For example, an asset end event, such as a television program's completion, may cause the client device to generate information that may be provided to analytics server 110 and received at block 202. As a result, after the information is generated in response to the asset end event, the information may be received at 202 and processed at 204 to determine the likelihood of consumption of the linear content. Blocks 202 and 204 may be performed after occurrence of predefined events including interval/interstitial events, tune-outs (e.g., changing a linear content stream or turning off the client device), and an asset end. In some embodiments, a certain type of event may cause information to be generated and received at block 202 but that type of event may not cause the determination at block 204 to occur. In such embodiments, it may be determined if the event is of a type for which likelihood of consumption is determined. Accordingly, if so, block 204 may occur. If not, the determination at block 204 may not occur. For instance, a tune-in event, such as a user changing the television channel, may cause information to be generated and then received at block 202 but the determination at block 204 may not occur. Other example event types that may not cause the determination at block 204 to occur include events and corresponding information that are unrelated to analytics. Expanding on the tune-in event example, a tune-in event may not be of a type for which the likelihood of consumption is determined. For some events, such as a tune-in event, the likelihood of consumption determination may be bypassed and a default value may be assigned as the likelihood of consumption. For example, the default value may be 100% that the user is consuming the linear content.

In one embodiment, before performing block 204, it may be determined if the period of time on which the information is based is greater than a threshold time (e.g., 20 seconds, 40 seconds, 60 seconds, 5 minutes, etc.). If so, the likelihood of consumption may be determined at block 204. If not, the likelihood of consumption may not be determined. Not determining the likelihood of consumption may provide a filter of sorts. For instance, a user may turn on the client device to set up a recording. In doing so, the client device may be tuned in to a channel, because client devices typically open on the last tuned channel or some default channel. In this example, after powering on the client device, the user may open a guide, push a record button, and turn off the client device all within the threshold period of time. As a result, the determination of the likelihood of consumption may not occur at block 204. In some instances, when the duration threshold is not met, a default score, such as 0 may be assigned to the event, or the event may not be assigned a score or recorded at all.

In some embodiments, after the determination at block 204, values/variables may be set or added to the information received at 202. The updated information may be provided to the content provider for further processing. For example, the score, a raw score, a counter, time of day, a concatenation of channel/guide ID/time of day/and score for likely consumers of content, a concatenation of channel/guide ID/time of day/ and score for unlikely consumers of content, and time consumed according to the analytics server may each be set in a variable and provided to the content provider.

The following examples include example strings, which may represent a portion of the information that may received at 202. Each of the following examples is in the linear video content context, but similar examples may occur for other linear content. In one example, a user may turn on a television, change the channel to an asset they want to watch, and then interact with the client device twice (e.g., turn the volume up (which may include multiple volume up button presses yet still count as a single interaction), and open the guide) before the next interstitial hit time. Note that in each example, 15 minute interstitial calls are used. Accordingly, the string of values for that next interstitial hit at the quarter hour mark may be false|1295475838|2|0-. Because the hit was sent, and subsequently received, at the quarter hour mark as opposed to a hit due to a channel change, the first value is false. The time stamp of this example hit was at 1295475838. The third value of the five values is 2, which represents the two user interactions since the last tune-in. The fourth value is 0 because it is in the first interstitial hit since the last tune-in. Finally, because the tune-in just happened, the fifth value is '-' because no programs have completed since the last tune-in. Because only one interstitial hit has passed since the last tune-in, and some user interactions have occurred, this example may result in a relatively high likelihood of consumption (e.g., viewing probability score).

In another example, two hours have elapsed since the television was turned off. The client device, however, remained on. Three, 30 minute assets have started and completed without a user watching. Just before the fourth asset completes, a user turns on the television and starts channel surfing. When the first channel change happens and the tune-out hit is sent, the string may be as follows: true|1295477858|0|6|30,30,30. Because the hit was sent as a direct result of the channel change, the first value is true. The timestamp of the previous hit (the interstitial hit that would have been sent halfway through the fourth asset) was 1295475838. The third value, 0, represents that 0 user interactions have occurred since the last asset complete. The fourth value, 6, represents that there have been 6 interstitial hits since the last tune-in (assuming 2 hours with 4 quarter hour hits each and leaving just before hit number 8). The fifth value may be 30,30,30 representing that three, 30 minute assets have completed since the last tune-in event. Because several assets have completed since a tune in as well as a high number of interstitial hits with no user interactions, a low likelihood of consumption may result in this example.

In a third example, a series of events may occur between a user tuning in at 00:10 and tuning out at 00:48. After the tune-in at 00:10 has been tuned in for 20 seconds, information may be generated and sent from the client device to the analytics server. If the user were to tune out before the 20 second mark, the information may not be generated or sent. An example portion of the information generated and sent by the client device and received by the analytics server may be represented in xml format as <eVar6>true|1309327200|0|0|-</eVar6>. In this example, an interstitial event may occur at 00:15 and may be represented as <eVar6>false|1309327800|0|0|-</eVar6>. Another interstitial event may occur at 00:30 and may be represented as <eVar6>false|1309328100|0|0|-</eVar6>. The asset may then complete at 00:35. The asset completion event may trigger another hit as <eVar6>false|1309329000|0|1|-</eVar6>. A new asset may then begin at 00:35 that is 45 minutes long. The asset begin may be represented as <eVar6>false|1309329300|0|1|-</eVar6>. An interstitial event may occur at 00:45 represented by <eVar6>false|1309329300|0|1|-</eVar6>. The example may conclude with a tune-out event as 00:48, which may be represented by <eVar6>true|1309330200|0|2|-</eVar6>. As noted above, the previous 3 examples may also include other information that is provided from the client device to the analytics server, in addition to the example xml format strings of values, but such information is not shown in the examples for ease of understanding purposes.

Turning now to FIG. 3, one embodiment of scoring linear content consumption information is illustrated. While the blocks are shown in a particular order for ease of understanding, other orders may be used. In some embodiments, the method of FIG. 3 may include additional (or fewer) blocks than shown. Blocks 302-324 may be performed automatically or may receive user input. The method of FIG. 3 may be used in conjunction with the method of FIG. 2. Accordingly, a combination of some or all of the blocks of FIGS. 2 and 3 may be used in some embodiments. In the illustrated embodiment, analytics server 110 may perform the method of FIG. 3.

As illustrated at 302, based on information received (e.g., at block 202 of FIG. 2), it may be determined if the event is of a type for which a score/likelihood of consumption is determined. If the event is not of a type for which a score is determined, the method of FIG. 3 may exit until the next information is received at 302. For example, the event that caused generation and reception of the information may not be related to user interactions or analytics at all. As a result, such information may not be scored. If the event is of a type for which a score is determined, the method may proceed to block 304.

At 304, the scoring interval may be determined. For example, the information (e.g., string of values) may be examined to determine the interval of time. In some cases, the second and fourth values of the example five value string described herein may be used to determine the interval. The asset begin time, which may be received as part of the information, may also be used in determining the segment to be scored because, in some examples, scoring segments may not cross asset boundaries. If the asset begin time is later than the timestamp of the previous hit, then the segment of time being scored may be from the asset begin time to the current time (or the time when the hit is received). Otherwise, the segment being scored may be from the previous hit time to the current time.

At 306, it may be determined if the period/interval is greater than a threshold (e.g., 30 seconds, 60 seconds, 5 minutes, etc.). If not, the method of FIG. 3 may exit until the next information is received at 302. If so, the method may proceed to block 308. Such a threshold determination may account for various latencies and delays that can occur in the data collection process. It may also help establish a margin of error as to when hits are sent from the client device and received by the scoring module.

As shown at 308, it may be determined if the previous event was a tune-in type event. If so, the likelihood of consumption may be the percentage of content consumed. For example, if the scoring interval is 15 minutes and the previous hit was a tune-in 7½ minutes into the scoring interval, the likelihood of consumption may be 50%. If the previous event was not a tune-in event, the method may proceed to block 310.

As illustrated at 310, the number of user interactions since the last asset complete or tune-in may be scored. The result may be the user interaction sub-score. As shown, the user interaction sub-score may be based on the information received at block 202 of FIG. 2 and may be used in final score calculation 320. In various embodiments, in a sequence of user interactions during the scoring interval, the first few user interactions may be weighted greater than subsequent user interactions. Thus, in such embodiments, the scoring of the user interactions may be scored according to a natural logarithmic progression. In the above example string of values, the number of user interactions may be reflected in the third value. The value may have an additive effect on the overall probability score based on a logarithmic scale of effect. Additive effect may mean that, in some instances, the overall score may be increased based on the user interaction sub-score but may not be decreased. In one embodiment, the logarithmic scale may be determined by the average number of user actions per interaction (e.g., 4 button presses to perform a record, 1 to use the guide, 1 to change channel). In other embodiments, a maximum number of user actions to perform an interaction may be used to determine the scale.

As shown at 312, the time may be determined. The time may be a time derived from the received information or it may be a local timestamp generated by the server performing the method of FIG. 3. The result may be a time, such as 2 p.m., 8 p.m., or 4 a.m., and may be referred to as the time of day sub-score. As was the case with the user interaction sub-score, the time of day sub-score may be used in final score calculation 320. Some times may be scored to reflect a higher likelihood of consumption than other times. For example, scoring module 112 may score a time interval that occurs at 8 p.m. (in the user's time zone) higher than one occurring at 4 a.m. Scoring of times may be based on statistical information regarding likelihood of consumption during various times of day. The time of day sub-score may be used to upwardly adjust the final score at 320 when the determined time is a time when a user is likely consuming linear content (e.g., 8 p.m.) and may downwardly adjust the final score at times when a user is not likely consuming linear content (e.g., 4 a.m.). Scoring module 112 may receive statistical data based on a typical user's consumption patterns and based on the received statistical data, generate the time of day sub-score. The statistical data may be updated periodically to reflect changing typical user's consumption patterns. For example, while 4 a.m. may be an unlikely time to consume linear content, in some circumstances, consumption patterns of the population may change. As a result, 4 a.m. could become a more likely consumption time and scoring module 112 may be updated to reflect that change. In various embodiments, the time of day sub-score may be the least indicative of consumption probability because it is indicative of the general population and not the specific user. As a result, the value of the sub-score may be weighted lesser than other sub-scores (e.g., 20% of the time-based sub-score in the final score calculation).

At 314, the time elapsed, e.g., as measured by the number of interstitial hits since the last tune-in event, may be determined. As shown, the scoring at 314 may be based on the information received at block 202 of FIG. 2. The result of the scoring may be referred to as the non-interaction interval sub-score, which may be provided to block 318. In some embodiments, the more time that has passed since the last tune-in event may correlate to a lower likelihood of consumption. For example, a user may have left a consumption device, such as a television, on in the background while working, studying, or may have left the room. As another example, a user may power off a television while leaving the client device on. As a result, the client device may continually receive the linear content and record interstitial hits while being located on the same channel. In some embodiments, the number of interstitial hits since the last tune-in event may have an inverse relationship with the non-interaction interval sub-score. At a certain number of interstitial hits, the likelihood may approach zero. As an example, in a scenario in which the length of each asset of linear content is 30 minutes with an interstitial interval of 15 minutes, after about 4.5 hours (9 assets, or 18 interstitial hits), scoring module 112 may assume that the user is very unlikely (e.g., at or near 0%) to be consuming the linear content. Thus, in some situations, after the 18 interstitial hits, which is just one example of a cut-off point, subsequent interstitial hits since the last tune-in event may not further reduce the non-interaction interval sub-score if it has already reached 0%. As a result, in those embodiments, 18 interstitial hits and 40 interstitial hits since the last tune-in event may be scored to have the same non-interaction interval sub-score. In embodiments using a cut-off, as described in the above example, the cut-off may be based on statistical information, direct measurement of consumption, or some other parameter(s) provided to scoring module 112. As was the case above with the user interaction sub-score, the number of interstitial hits may have an additive effect on the overall probability score based on a logarithmic scale of effect, or in other embodiments, a linear scale of effect.

As shown at 316, the number and length of assets since the last tune-in event may be determined. As was the case with blocks 302, 310, and 314, the determination may be based on the information received at block 202. The result of the determination may be referred to as the non-interaction asset sub-score, which may be provided to block 318. Continuing the example from block 314, the number of assets since last tune-in may be determined as 9 assets and the length of the assets may be determined as 30 minutes for each. Note that assets may be different lengths. For example, in a linear audio content example, an asset may be an individual song. Thus, in many linear audio content examples, each song may be a different length and as a result, each asset may also be a different length. The sub-scores from blocks 312, 314, and 316 may collectively be referred to as the time-based sub-score.

As illustrated at 318, the lower sub-score of the non-interaction interval sub-score of block 314 and the non-interaction asset sub-score of block 316 may be filtered out as a Type 1 error bias. As a result, the higher of the two sub-scores may be provided to block 320 for final score calculation. As an example, a user may consume a long asset, such as a 3 hour long movie or a sporting event. At the end of the asset, the non-interaction interval sub-score of 314 may be relatively low due to 12 interstitial hits since the last tune-in event (based on 15 minute intervals). The non-interaction asset sub-score, however, may not be scored as low because only 1 asset was received by the client device over that 3 hour period. As a result, the lower score, in this case, the non-interaction interval sub-score from 314 may be filtered out and the non-interaction asset sub-score from 316 may be used in the final score calculation at 320. The resulting sub-score that is used at 320 may make up a higher percentage of the time-based sub-score than the time of day sub-score. As noted above, in some instances, the time of day sub-score may make up 20% of the time-based sub-score. In such an example, the resulting sub-score from 318 may make up the other 80%.

At block 320, the final score may be calculated. As one example of final score determination, the user-interaction sub-score may be added on top of the time-based sub-score with a capped maximum score of 100. As described herein, sub-scores relating to direct user input may be weighted higher than other sub-scores. For example, in one embodiment, the sub-scores may be weighted, in order from highest to lowest, the user interaction sub-score from block 310, the non-interaction asset sub-score of block 316, the non-interaction interval sub-score of block 314, and the time of day sub-score of block 312. Other embodiments may use a different weighting of the sub-scores. For instance, the user interaction sub-score may be weighted the highest (e.g., 40% of the total score) but the other sub-scores may be weighted equally (20% for each of the 3 other sub-scores). Further, in an embodiment in which block 318 filters one of the non-interaction sub-scores, one of the sub-scores may not be used in the final score calculation (e.g., weighted at 0%). As a result, one example embodiment of the final score calculation may weight the user interaction sub-score at 60%, the remaining non-interaction sub-score from 318 at 30%, and the time of day sub-score at 10%.

At block 322, it may be determined if the information corresponded to a tune-out event. If so, a multiplier may be applied to the final score at block 324 resulting in a modified final score. For example, the multiplier may reflect the percentage of the time interval that has elapsed. If the time interval is 15 minutes long and the tune-out event was 12 minutes into the interval, the multiplier may be 80% to reflect that 80% of the interval had passed. The multiplier may account for the segment that was not viewed. If the event was not a tune-out event, the final score calculated at 320 may be the final score. In some embodiments, the determination at block 204 of FIG. 2 may include blocks 310-324.

In various embodiments, the final calculated score may be provided to a data collection platform in the form of a numerical score and/or a classification of the score (e.g., very likely, somewhat likely, etc.). The final score calculation and classification may be generated as metadata. As used herein, likelihood of consumption may refer to a score, such as a scaled score between 0 and 100 that may represent a percentage likelihood, and/or it may refer to a descriptive term, such as very likely, somewhat likely, equally likely and unlikely, somewhat unlikely, and very unlikely. The descriptive terms may be based on the score. As one example, very likely may correspond to a scaled score between 80 and 100. Somewhat likely may correspond to a scaled score between 60 and 80, equally likely and unlikely between 40 and 60, somewhat unlikely between 20 and 40, and very unlikely from 0 to 20.

The disclosed linear content consumption likelihood techniques may provide a more accurate measure of consumption of linear content, especially for niche content streams where sampling methods (e.g., Nielsen) may be inaccurate. Further, the disclosed techniques may provided for detailed consumption data with little to no delay (e.g., less than 30 minutes), as opposed to panel-based solutions that typically lag months or weeks behind. In addition, the disclosed techniques may measure consumption more accurately by not requiring additional non-consumption related activities from a user, unlike sample-based approaches that require viewers to use new devices, note assets consumed, or perform actions that may otherwise taint the sample results.

Turning now to FIG. 4, one embodiment of generating linear content consumption information is illustrated. While the blocks are shown in a particular order for ease of understanding, other orders may be used. In some embodiments, the method of FIG. 4 may include additional (or fewer) blocks than shown. Blocks 402-404 may be performed automatically or may receive user input. In the illustrated embodiment, a client device may perform the method of FIG. 4.

As illustrated at 402, a client device may receive one or more interactions from a client control device. The one or more interactions may be received by the client device during a period in which the client device receives linear content. As described herein, interactions may include button presses on a client control device (e.g., remote control). A single interaction may be a series of individual communications between the client control device and client device. For example, if a user invokes a program guide and pushes a down arrow 25 times to cycle through the guide, such communications between the client control device and client device may be a single interaction and not 25 interactions. Interactions may include tune-ins, tune-outs, or other interactions.

At 404, information may be provided to a server configured to determine a likelihood of consumption of the linear content based on the information. For instance, the server may be configured to implement the methods of FIGS. 2 and 3. The information may include data corresponding to the one or more interactions. Such data may include a quantity of user interactions with the client device since a reference point in time and a time of a most recent user interaction with the client device, among other data. Providing the information may be performed in response to an occurrence of a predefined event, and the information may include an indication of the type of predefined event. The information may correspond to a period during which linear content was received by the client device.

In various embodiments, the client device may generate the information. The client device may generation the information in response to occurrence of an event. Various events upon which information may be generated may include tune-in events, tune-out events, interstitial events (e.g., every 15 minutes, every 30 minutes, etc.), asset start events, asset complete events, among other events. The client device may also generate additional information to provide to the server that may not be related to interactions with the client device and may not be analytics related. Moreover, other information, not related to interactions but that may be used by the server to determine a likelihood of consumption may be generated with the other information. Such information may include the length of an asset, device ID, etc.

In one embodiment, the linear content may be received from a content provider over one path and the information may be provided to an analytics server over a different path. As an example, linear content may be received from a content provider over a coaxial network whereas the information that includes data corresponding to interactions with the client device may be provided to the server over a LAN. In other embodiments, the linear content may be received by the client device from the content provider over a path (e.g., coaxial network) and the client device may provide the information to the content provider over the same data path. The information may then be provided to the server over a LAN from the content provider.

It will be appreciated that the methods of FIGS. 2-4 are example embodiments of methods employed according to the techniques described herein. The methods of FIGS. 2-4 may be modified to facilitate variations of its implementations and uses. For example, although some embodiments have been described with respect to linear content, the techniques may be applied for use with similar content. The methods of FIGS. 2-4 may be implemented in software, hardware, or a combination thereof.

Exemplary Computer System

Figure 5:
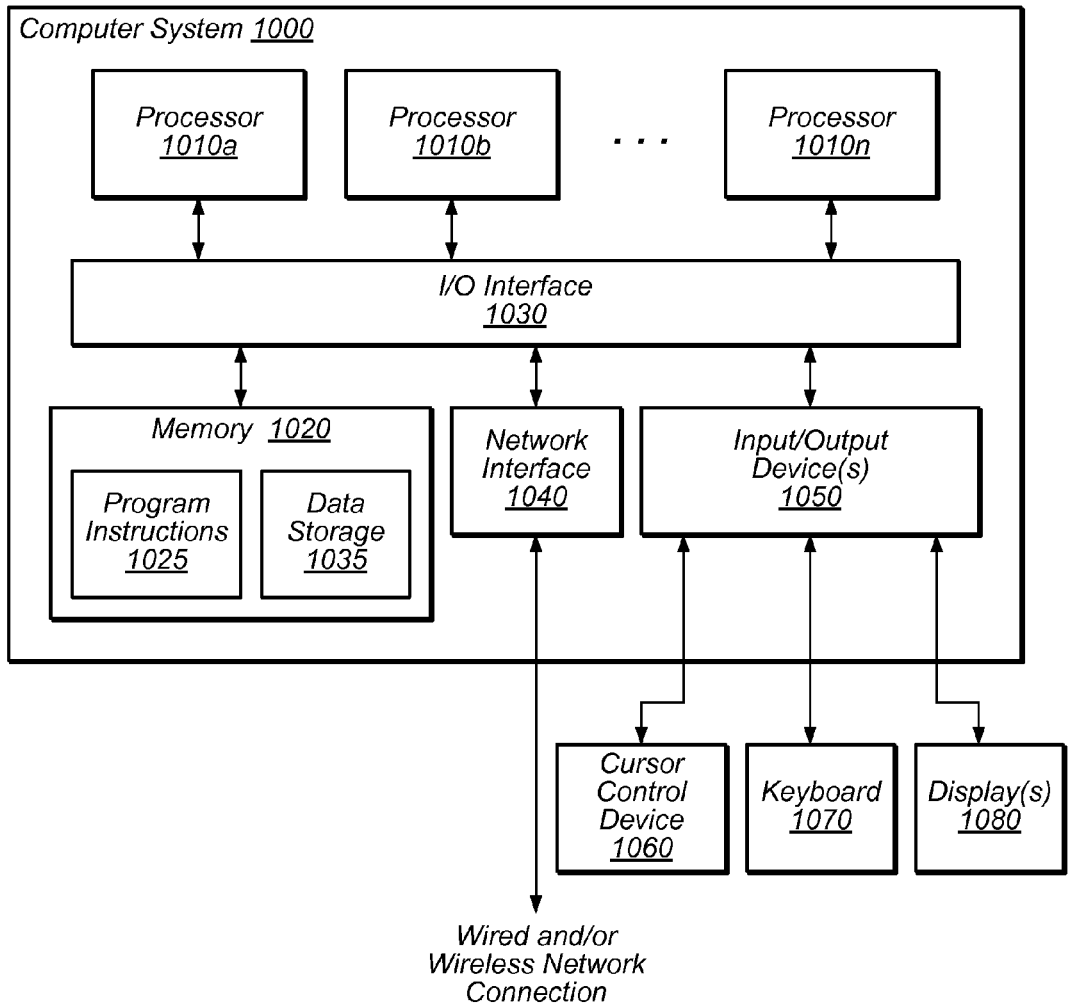
FIG. 5 illustrates an example computer system that may be used in accordance with one or more embodiments.

Various portions of scoring module 112 and/or linear content consumption information generation may be executed on one or more computer systems, which may interact with various other devices. One such computer system is illustrated by FIG. 5. For example, content provider 120, client device 102, analytics server 110, and scoring module 112 may each include, employ or be executed on one or more computer systems.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for layout-preserved text generation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a layout-preserved text generation method, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g., network 108), such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Memory 1020 may include program instructions 1025, configured to implement embodiments of scoring module as described herein, and data storage 1035, comprising various data accessible by program instructions 1025. In one embodiment, program instructions 1025 may include software elements of a likelihood of consumption generation method illustrated in the above Figures. In other embodiments, other or different software elements and/or data may be included.

Those skilled in the art will appreciate that computer system 1000 is merely illustrative and is not intended to limit the scope of linear content consumption information generation or likelihood of consumption of linear content methods as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the disclosed embodiments may be practiced with other computer system configurations. In some embodiments, portions of the techniques described herein may be hosted in a cloud computing infrastructure.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the embodiments embrace all such modifications and changes and, accordingly, the above description to be regarded in an illustrative rather than a restrictive sense.

What is claimed is:

1. A method, comprising:

receiving information indicative of one or more user interactions with a client device during a period of time in which the client device received linear content comprising one or more assets;

wherein the information includes user interaction information indicating a quantity of user interactions with the client device since the occurrence of a last tune-in event, time information indicating a time of day at which the information is collected, elapsed-time information indicating an elapsed time since the occurrence of the last tune-in event, and asset information indicating a quantity of the assets and a length of each of the assets received by the client device since the occurrence of the last tune-in event;

determining, based at least in part on the information, sub-scores corresponding to each of the user interaction information, the time information, the elapsed-time information, and the asset information;

wherein the last tune-in event indicates that a user had tuned in, with the client device, to the linear content; and determining a score indicating a likelihood that the linear content has been consumed by the user based at least in part on weighted contributions of portions of the information, wherein at least some of the weighted contributions each correspond to at least one of the sub-scores.

2. The method of claim 1, wherein said steps of receiving the information and determining the score indicating the likelihood that the linear content has been consumed are performed after an occurrence of a predefined event.

3. The method of claim 2, further comprising receiving an indication of a type of the predefined event.

4. The method of claim 1, further comprising, prior to determining the score indicating the likelihood that the linear content has been consumed, determining that the period during which the client device received the linear content is greater than a threshold time.

5. The method of claim 1, wherein the information further includes quantity information indicating a quantity of user interactions with the client device since a reference point in time and a time of a most recent user interaction with the client device, and the method further comprises determining a sub-score corresponding to the quantity information.

6. The method of claim 1, further comprising, prior to determining the score indicating the likelihood that the linear content has been consumed, determining that an event that occurred prior to receiving the information indicative of the tune-in event is of a type in response to which the likelihood of consumption is to be determined.

7. The method of claim 1, wherein the information is received directly from the client device.

8. A non-transitory computer-readable storage medium storing program instructions, wherein the program instructions are computer-executable to cause a computing apparatus to perform steps comprising:

receiving information indicative of one or more user interactions with a client device, during a period in which the client device received linear content comprising one or more assets;

wherein the information include user interaction information indicating a quantity of user interactions with the client device since the occurrence of a last tune-in event, time information indicating a time of day at which the information is collected, elapsed-time information indicating an elapsed time since the occurrence of the last tune-in event, and asset information indicating a quantity of the assets and a length of each of the assets received by the client device since the occurrence of the last tune-in event;

determining, based at least in part on the information, sub-scores corresponding to each of the user interaction information, the time information, the elapsed-time information, and the asset information;

wherein the last tune-in event indicates that a user had tuned in, with the client device, to the linear content; and determining a score indicating a likelihood that the linear content has been consumed by the user based at least in part on weighted contributions of portions of information, wherein at least some of the weighted contributions each correspond to at least one of the sub-scores.

9. The non-transitory computer-readable storage medium of claim 8, wherein said steps of receiving information and determining the score indicating the likelihood that the linear content has been consumed are performed after an occurrence of a predefined type of event.

10. The non-transitory computer-readable storage medium of claim 9, wherein the program instructions further cause the computing apparatus to perform steps comprising receiving an indication of a type of the predefined event.

11. The non-transitory computer-readable storage medium of claim 8, wherein the program instructions further cause the computing apparatus to perform steps comprising, prior to determining the score indicating the likelihood that the linear content has been consumed, determining that the period during which the client device received the linear content is greater than a threshold time.

12. The non-transitory computer-readable storage medium of claim 8, wherein the information further includes quantity information indicating a quantity of user interactions with the client device since a reference point in time and a time of a most recent user interaction with the client device, and the program instructions further cause the computing apparatus to perform steps comprising determining a sub-score corresponding to the quantity information.

13. The non-transitory computer-readable storage medium of claim 8, wherein the program instructions further cause the computing apparatus to perform steps comprising, prior to determining the score indicating the likelihood that the linear content has been consumed, determining that an event that occurred prior to receiving the information indicative of the tune-in event is of a type in response to which the likelihood of consumption is to be determined.

14. The non-transitory computer-readable storage medium of claim 8, wherein the information is received directly from the client device.

* * * * *